US010399602B2

(12) United States Patent
Jun et al.

(10) Patent No.: US 10,399,602 B2
(45) Date of Patent: Sep. 3, 2019

(54) VEHICLE BODY INCLUDING REINFORCEMENT ON ROCKER PANEL

(71) Applicant: Ford Global Technologies, LLC, Dearborn, MI (US)

(72) Inventors: GaRam Jun, Ann Arbor, MI (US); Bret Kirchner, Ann Arbor, MI (US); Chienhom Lee, Farmington Hills, MI (US); Ken Garbinski, Saline, MI (US); Christopher John May, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 287 days.

(21) Appl. No.: 15/435,666

(22) Filed: Feb. 17, 2017

(65) Prior Publication Data
US 2018/0237072 A1 Aug. 23, 2018

(51) Int. Cl.
*B62D 25/04* (2006.01)
*B62D 27/02* (2006.01)
*B62D 21/15* (2006.01)
*B62D 25/02* (2006.01)

(52) U.S. Cl.
CPC .......... *B62D 21/157* (2013.01); *B62D 25/025* (2013.01); *B62D 25/04* (2013.01); *B62D 27/02* (2013.01); *B60Y 2410/121* (2013.01); *B60Y 2410/122* (2013.01); *B60Y 2410/124* (2013.01)

(58) Field of Classification Search
CPC ..... B62D 21/157; B62D 25/025; B62D 27/02
See application file for complete search history.

(56) References Cited

U.S. PATENT DOCUMENTS

| 7,152,914 B2 | 12/2006 | Dingman et al. | |
| 7,976,098 B2 * | 7/2011 | Nishimura | B62D 21/157 296/193.06 |
| 8,757,709 B2 | 6/2014 | Rawlinson et al. | |
| 8,998,263 B1 | 4/2015 | Yustick et al. | |
| 9,487,239 B2 | 11/2016 | Schnug et al. | |
| 2014/0084633 A1 * | 3/2014 | Matsuda | B62D 25/02 296/203.01 |
| 2015/0021954 A1 * | 1/2015 | Hayakawa | B62D 25/025 296/187.12 |
| 2015/0175218 A1 * | 6/2015 | Yoshioka | B62D 25/025 296/203.01 |
| 2016/0152274 A1 * | 6/2016 | Kang | B62D 21/157 296/187.12 |
| 2016/0194034 A1 * | 7/2016 | Emura | B62D 25/025 296/209 |

(Continued)

FOREIGN PATENT DOCUMENTS

| DE | 102013225661 A1 * | 6/2014 | .......... B62D 25/025 |
| JP | 2009196405 A | 9/2009 | |

(Continued)

*Primary Examiner* — Hilary L Gutman
(74) *Attorney, Agent, or Firm* — Vichit Chea; Bejin Bieneman PLC (57) ABSTRACT

A vehicle body includes a rocker panel elongated along an axis. The vehicle body includes a pillar fixed to the rocker panel and elongated in a direction transverse to the axis. The rocker panel includes a first flange and a second flange. The first flange and the second flange are on opposite sides of the pillar and spaced from each other in a direction parallel to the axis. The vehicle body includes a reinforcement fixed to the first and second flanges.

19 Claims, 5 Drawing Sheets

(56) References Cited

U.S. PATENT DOCUMENTS

| | | | | |
|---|---|---|---|---|
| 2016/0236719 A1* | 8/2016 | Tanaka | ............ | B62D 25/04 |
| 2016/0257348 A1* | 9/2016 | Balur | ............ | B62D 25/025 |
| 2016/0355214 A1* | 12/2016 | Irie | ............ | B62D 21/157 |
| 2017/0305469 A1* | 10/2017 | Iyoshi | ............ | B62D 25/025 |
| 2018/0065680 A1* | 3/2018 | Kamimura | ............ | B60R 22/34 |
| 2018/0170444 A1* | 6/2018 | Nakamoto | ............ | B62D 27/02 |

FOREIGN PATENT DOCUMENTS

| | | | | |
|---|---|---|---|---|
| JP | 2014118109 A | * | 6/2014 | ......... B62D 25/025 |
| KR | 1020110071242 A | | 6/2011 | |

* cited by examiner

VEHICLE BODY INCLUDING REINFORCEMENT ON ROCKER PANEL

BACKGROUND

A vehicle body may include a door ring defining a door opening. The door ring includes a front pillar, a rear pillar, a rocker panel, and a roof rail surrounding the door opening. The front pillar and the rear pillar, for example, may be the A pillar and the B pillar. A door may be rotatably mounted to one of the pillars.

The vehicle body may include a reinforcement fixed to the rear pillar. In one type of vehicle body, the front pillar, the rear pillar, the rocker panel, and the roof rail are distinct and separate components that are formed separately and joined together to form the door ring.

DETAILED DESCRIPTION

With reference to the Figures, wherein like numerals indicate like parts throughout the several views, a vehicle body 12 of a vehicle 10 is generally shown. The vehicle body 12 includes a rocker panel 16, i.e., an outer rocker panel 16. The outer rocker panel 16 is elongated along an axis 30. The vehicle body 12 includes a pillar 24 fixed to the outer rocker panel 16, and the pillar 24 is elongated in a direction transverse to the axis 30. The outer rocker panel 16 includes a first flange 32 and a second flange 34. The first flange 32 and the second flange 34 are on opposite sides of the pillar 24, and spaced from each other in a direction parallel to the axis 30. The vehicle body 12 includes a reinforcement 18 fixed to the first and second flanges 32, 34.

Since the reinforcement 18 is fixed to both the first and second flanges 32, 34, the reinforcement 18 reinforces the outer rocker panel 16 of a rocker 66 along the axis 30 between the first and second flanges 32, 34. For example, in this configuration, the reinforcement 18 provides structural support to the outer rocker panel 16 when the outer rocker panel 16 is loaded in an axial direction, i.e., along the axis 30. Specifically, as set forth further below a lower member 22 of the reinforcement 18 is fixed to both the first and second flanges 32, 34. As one example, the reinforcement 18, i.e., the lower member 22, reinforces the outer rocker panel 16 during small overlap rigid barrier (SORB) tests. The SORB test is standardized by the Insurance Institute for Highway Safety (IIHS). In the SORB test, a rigid barrier overlaps a driver side of the vehicle 10 by 25% of a vehicle's front end at an initial speed of 40 mph. By being fixed to the first flange 32 and the second flange 34, the reinforcement 18, i.e., the lower member 22, strengthens a potential area of weakness that may be loaded during the SORB test. In other words, the lower member 22 bridges the first flange 32 and the second flange 34 to resist buckling of the outer rocker panel 16, i.e., resisting buckling of the rocker 66. Similarly, the lower member 22 resists buckling in a rear impact test. As another example, during a roof crash test, impact loading is transferred through the pillar 24, and the lower member 22 resists separation between the first flange 32 and the second flange 34, which increases the bending strength of the inner rocker panel 16, i.e., increasing the bending strength of the rocker 66. As another example, during a side impact load, e.g., during a side impact test, the lower member 22 resists separation between the first flange 32 and the second flange 34, which increases the bending strength of the inner rocker panel 16, i.e., increasing the bending strength of the rocker 66.

The vehicle 10 may be, for example, any type of passenger automobile. As shown in the figures, the vehicle body 12 may have a unibody construction, i.e., a unitary-body construction. In the unibody construction, the vehicle body 12 serves as the vehicle frame, and the components of the vehicle body 12 (including rockers 66, pillars 24, 26, roof rails 28, etc.) are fixed together as a one-piece unit. As another example, not shown in the figures, the vehicle 10 may include a frame, and may have a body-on-frame construction (also referred to as a cab-on-frame construction). In other words, the vehicle body 12 and the frame are separate components, i.e., are modular, and the vehicle body 12 is supported on and affixed to the frame. Alternatively, the vehicle body 12 may have any suitable construction. The vehicle body 12 and/or the frame may be formed of any suitable material, for example, steel, aluminum, plastic, fiber-reinforced composite, etc.

Figure 2:
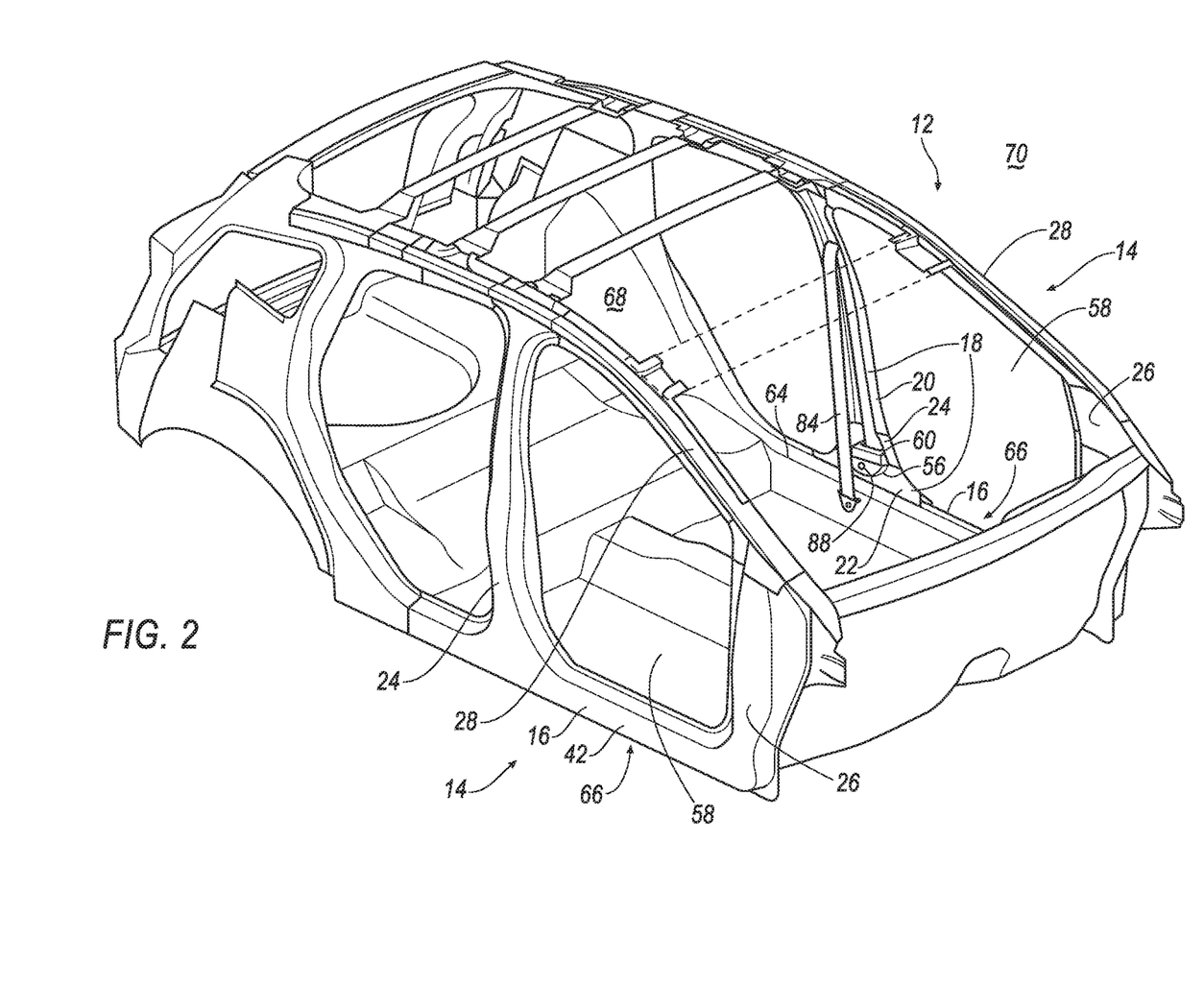
FIG. 2 is a perspective view of the vehicle body and a seat belt assembly connected to the vehicle body.

As shown in FIG. 2, the vehicle body 12 includes a door ring 14. Specifically, the vehicle body 12 may include two door rings 14 spaced from each other in a cross-vehicle direction. The door rings 14 shown in FIG. 2 are front door rings, i.e., AB rings defined by A pillars and B pillars (i.e., pillars 24, 26 discussed further below). Alternatively, the door rings 14 may be rear door rings, i.e., BC rings defined by B pillars and C pillars, or at any other door location of the vehicle 10. The two door rings 14 shown in FIG. 2 are mirror images of each other, and common numerals are used to identify common features with reference to the two door rings 14.

Figure 1:
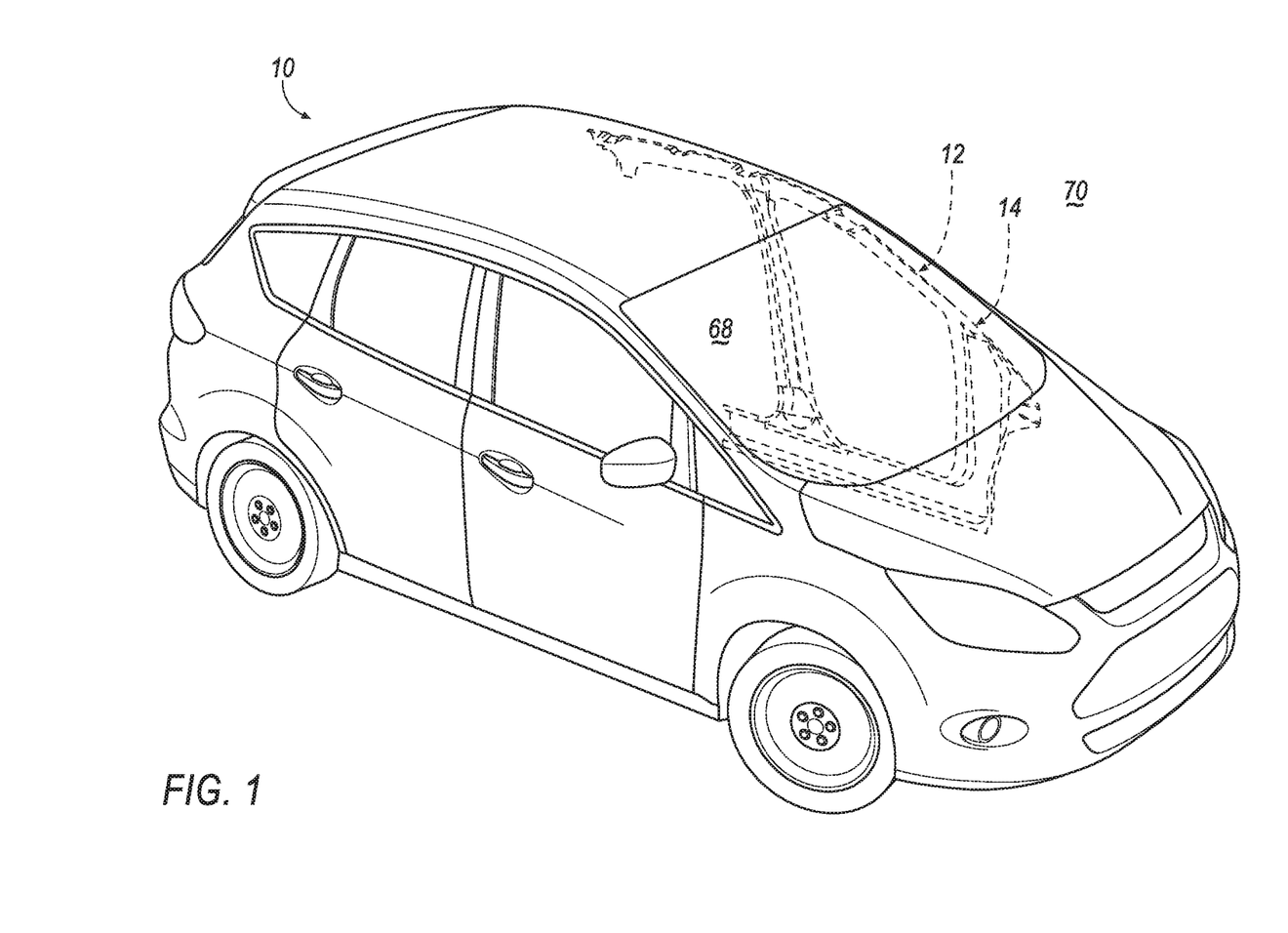
FIG. 1 is a perspective view of a vehicle including a vehicle body having a door ring shown in hidden lines.
Figure 3:
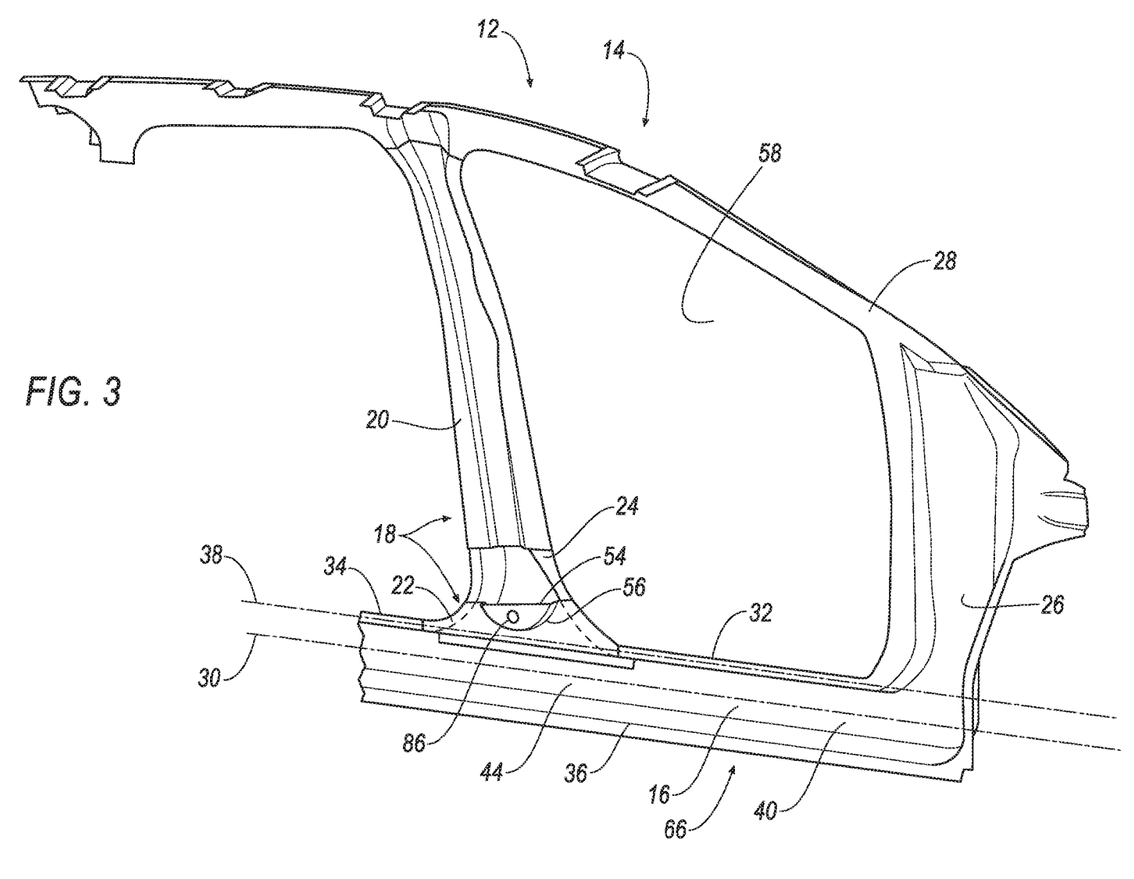
FIG. 3 is a perspective view of the door ring including an outer rocker panel and a reinforcement fixed to the outer rocker panel.

With reference to FIGS. 1 and 3, the door ring 14 includes the pillar 24, a second pillar 26, the outer rocker panel 16, and a roof rail 28. The door ring 14, i.e., the pillar 24, the second pillar 26, the outer rocker panel 16, and the roof rail 28, may be integral. In other words, the pillar 24, the second pillar 26, the outer rocker panel 16, and the roof rail 28 may be formed together simultaneously as a continuous, one-piece unit. In this instance, the pillar 24, the second pillar 26, the outer rocker panel 16, and the roof rail 28 are integrally formed, i.e., a one-piece unit formed in a single process, e.g., stamped from a single blank. Alternatively, the pillar 24, the second pillar 26, the outer rocker panel 16, and the roof rail 28 may be formed separately and subsequently assembled together, i.e., merged.

The configuration in which the door ring 14 is integral reduces the total number of components of the vehicle body 12. The reduction of components results in fewer seams between components of the vehicle body 12, which may increase the strength and structural rigidity of the door ring 14, and the vehicle body 12 as a whole, e.g., during the SORB test, a rear impact test, side impact test, roof crash test, etc.

The door ring 14 may be formed of any suitable material, for example, steel, aluminum, plastic, fiber-reinforced composite, etc. The door ring 14, including the pillar 24, the second pillar 26, the outer rocker panel 16, and the roof rail 28, may be formed from a single blank, e.g., by stamping. The single blank may be formed from multiple segments fixed together by laser welding, i.e., laser-welded blanks, or any other suitable fashion.

With continued reference to FIGS. 1-3, the door ring 14, i.e., the pillar 24, the second pillar 26, the outer rocker panel 16, and the roof rail 28, define an opening 58. The pillar 24 may be opposite the second pillar 26, and the outer rocker panel 16 may be opposite the roof rail 28. The door ring 14 defines the perimeter of the opening 58. The door ring 14 may be configured to receive a door (not numbered). When the door is engaged with the door ring 14, the opening 58 may be covered by the door.

With reference to FIGS. 1-4, the vehicle body 12 includes two rockers 66. Each rocker 66 includes the outer rocker panel 16 and an inner rocker panel 64. As set forth above, the outer rocker panel 16 is elongated along the axis 30. As set forth above, the inner rocker panel 64 is elongated along the axis 30, i.e., is elongated in a direction parallel to the axis 30 and is on or spaced from the axis 30. The axis 30 may be parallel to a longitudinal axis of the vehicle 10, as shown in FIG. 1.

As set forth above, the first flange 32 and the second flange 34 are on the outer rocker panel 16. In addition, the first flange 32 and the second flange 34 are on the pillar 24. In other words, both the outer rocker panel 16 and the pillar 24 include the first flange 32 and the second flange 34.

Figure 4:
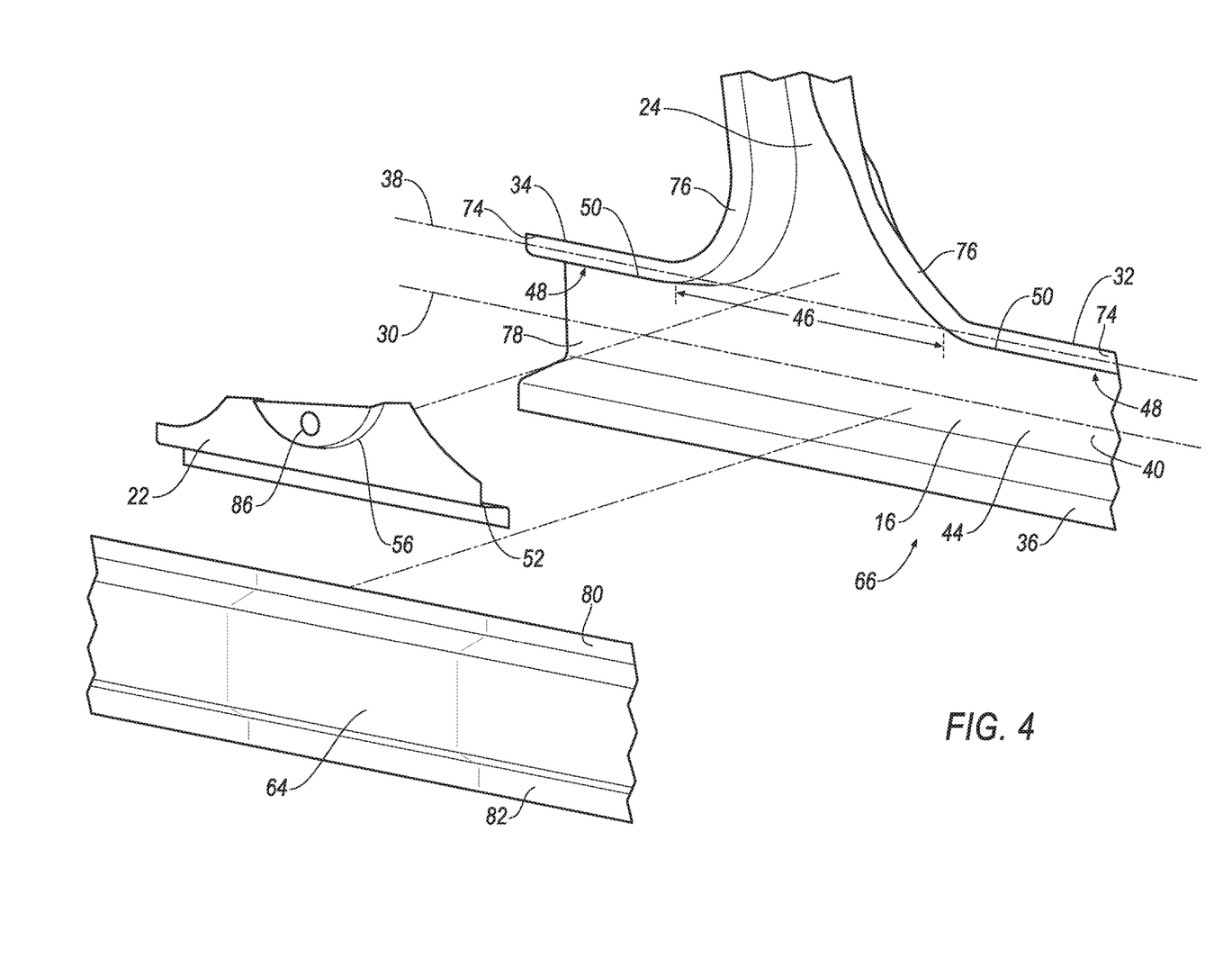
FIG. 4 is an exploded view of a portion of the outer rocker panel and the reinforcement.

With reference to FIGS. 3 and 4, at least a portion of the first flange 32 and the second flange 34 are both on a common axis 38. For example, with reference to FIG. 4, the first and second flanges 32, 34 each include a base portion 74 on the common axis 38. The first and second flanges 32, 34 each include a transverse portion 76 that extends away from the base portions 74 along the pillar 24. The base portions 74 may be straight, i.e., on the common axis 38, and the transverse portions 76 may curve away from the base portions 74 and may follow the path of the pillar 24. The transverse portions 76 are elongated in a direction transverse to the axis 30, i.e., a direction not parallel with the axis 30. The common axis 38 may be spaced from and parallel to the axis 30.

With reference to FIG. 4, the first flange 32 and the second flange 34 define a gap 46, hereinafter referred to as a flange gap 46, extending from the first flange 32 to the second flange 34. The flange gap 46 extends along the common axis 38, i.e., extends on or in a direction parallel to the common axis 38. For example, as shown in FIG. 4, the flange gap 46 extends from the first flange 32 to the second flange 34 on the common axis 38.

With continued reference to FIG. 4, the outer rocker panel 16 includes a lower flange 36 elongated along the axis 30, i.e., elongated on the axis 30 or in a direction parallel to the axis 30. In the configuration shown in FIG. 4, the lower flange 36 is spaced from the axis 30. As shown in FIGS. 1 and 2, the first flange 32, the second flange 34, and the lower flange 36 may be horizontal when the vehicle 10 is at rest.

The lower flange 36 is spaced from the first and second flanges 32, 34 in a direction transverse to the axis 30. For example, the lower flange 36 may be below the first and second flanges 32, 34 and elongated in parallel with the first and second flanges 32, 34.

With continued reference to FIG. 4, the outer rocker panel 16 may have a hat-shaped cross-section. The outer rocker panel 16 includes a channel 44 defined by the lower flange 36 and the first and second flanges 32, 34. For example, the lower flange 36 may be one end of the channel 44, and the first and second flanges 32, 34 may be the other end of the channel 44. The channel 44 is elongated along the axis 30, i.e., on or parallel to the axis 30.

A back wall 78 extends from the first flange 32 to the second flange 34 along the channel 44. With continued reference to FIG. 4, the first and second flanges 32, 34 each have a step 48 elongated along the axis 30, i.e., on or parallel to the axis 30. Each step 48 has a step shape 50, The step shape 50 is perpendicular to the axis 30, and the steps 48 are elongated along the axis 30 to bolster structural rigidity when loaded axially, e.g., in SORB testing.

The outer rocker panel 16 includes an interior surface 40 and an exterior surface 42 opposite the interior surface 40. The interior surface 40 faces an interior 68 of the vehicle 10, and the exterior surface 42 faces an exterior environment 70. The first and second flanges 32, 34 are disposed on the interior surface 40. For example, the first and second flanges 32, 34 face the interior 68 of the vehicle 10.

With continued reference to FIG. 4, the inner rocker panel 64 may be hat-shaped. The inner rocker panel 64 is fixed to the outer rocker panel 16 and encloses the channel 44 between the inner rocker panel 64 and the outer rocker panel 16, as shown in FIG. 2. Specifically, the inner rocker panel 64 may include an upper flange 80 fixed to the first flange 32, the second flange 34, and a lower flange 82 fixed to the lower flange 36. For example, the inner rocker panel 64, e.g., the upper and lower flanges 80, 82, may be welded to the outer rocker panel 16, e.g., the first flange 32, the second flange 34, and the lower flange 36, by welding or in any other suitable fashion.

As set forth above, the door ring 14 includes the pillar 24. As also set forth above, the pillar 24 is elongated in a direction transverse to the axis 30, i.e., in a non-parallel direction relative to the axis 30. For example, as shown in FIGS. 1 and 2, the pillar 24 is elongated in an upward direction from the rocker 66 to the roof rail 28, i.e., extends upwardly along a body side of the vehicle 10. The pillar 24 may be elongated in a generally vertical direction. As shown in FIGS. 1 and 2, the pillar 24 is the second pillar from the front of the vehicle 10, i.e., is referred to as a B pillar.

As set forth above, the door ring 14 includes the second pillar 26. As also set forth above, the pillar 24 is transverse to the axis 30, i.e., in a non-parallel direction relative to the axis 30. The second pillar 26 is elongated in an upward direction from the rocker 66 to the roof rail 28, i.e., extends upwardly along a body side of the vehicle 10. The second pillar 26 may be elongated in an upward and vehicle-rearward direction. As shown in FIGS. 1 and 2, the second pillar 26 is the first pillar from the front of the vehicle 10, i.e., is referred to as the A pillar. In addition to the first and second pillars 24, 26, the vehicle body 12 may include any suitable number of pillars in any suitable location, e.g., a C pillar, a D pillar, etc.

Each roof rail 28 extends from the pillar 24 to the second pillar 26. The roof rail 28 may be elongated generally horizontally. As shown in FIG. 1, the roof rails 28 may support roof beams, i.e., cross-members, which are shown and not numbered in FIG. 1.

With reference to FIG. 3, the reinforcement 18 includes an upper member 20 and a lower member 22 spaced from the upper member 20. The lower member 22 is spaced from the upper member 20 in a direction transverse to the axis 30. As set forth above, the lower member 22 is fixed to the rocker 66. The upper member 20 may be fixed to the roof rail 28.

The reinforcement 18, i.e., both the upper member 20 and the lower member 22, faces the interior 68 of the vehicle 10.

The lower member 22 is fixed to the interior surface 40 of the outer rocker panel 16. The reinforcement 18, i.e., the upper member 20 and the lower member 22, may be formed of any suitable material, for example, steel, aluminum, plastic, fiber-reinforced composite, etc. The reinforcement 18 may be formed by any suitable process, for example, stamping.

With continued reference to FIG. 3, the upper member 20 is fixed to the pillar 24, e.g., by welding. Specifically, the upper member 20 may include flanges (not numbered) fixed, e.g., welded, to the transverse portions 76 of the first and second flanges 32, 34. The upper member 20 reinforces the pillar 24. The upper member 20 is elongated in a direction transverse to the axis 30, i.e., in a non-parallel direction relative to the axis 30.

With reference to FIGS. 3 and 4, the lower member 22 is fixed to the outer rocker panel 16. Specifically, the lower member 22 is fixed to the first and second flanges 32, 34, e.g., by welding. The lower member 22 extends from the first flange 32 to the second flange 34 and reinforces the outer rocker panel 16 along the axis 30 between the first and second flanges 32, 34, as described above. The lower member 22, specifically, is fixed to the base portions 74 of the first and second flanges 32, 34. As set forth further below, the lower member 22 is fixed to the back wall 78 of the outer rocker panel 16.

Figure 5:
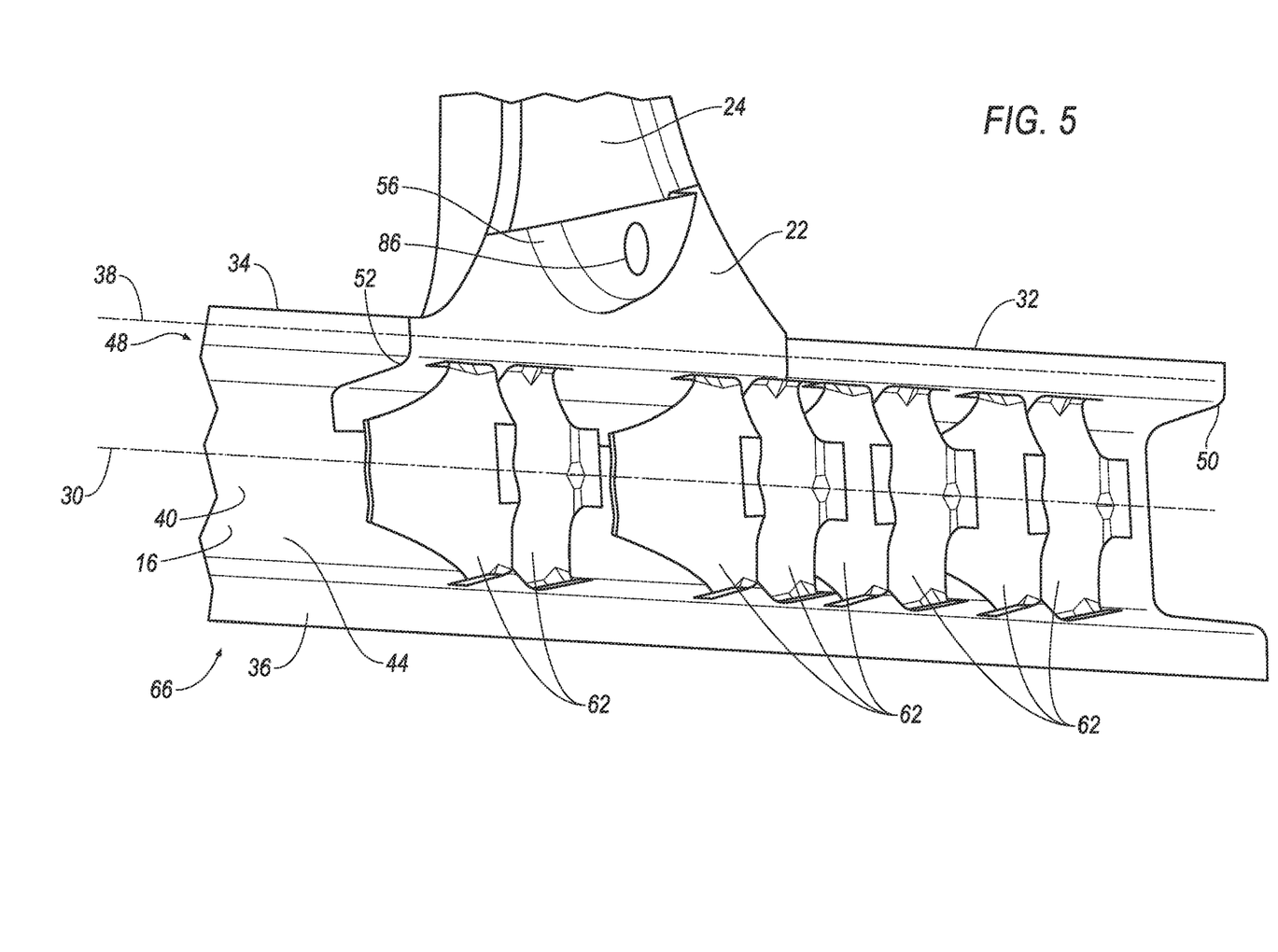
FIG. 5 is a perspective view of a portion of the outer rocker panel and a plurality of reinforcing members in the outer rocker panel.

The lower member 22 may be fixed to the pillar 24, as shown in FIGS. 3-5. Specifically, the lower member 22 may be fixed to, e.g., welded to, the first and second flange 32, 34 along the pillar 24. Specifically, the lower member 22 may be fixed to, e.g., welded to, the transverse portions 76 of the first and second flanges 32, 34. The lower member 22 may extend continuously from the outer rocker panel 16 to the pillar 24 along the first and second flanges 32, 34, i.e., along both the base portions 74 and the transverse portions 76 of the flanges 32, 34.

The lower member 22 of the reinforcement 18 may be pinched between the outer rocker panel 16 and the inner rocker panel 64. Specifically, the lower member 22 may be pinched between the upper flange 80 of the inner rocker panel 64 and the first and second flanges 32, 34 of the outer rocker panel 16. The lower member 22 may be directly fixed, e.g., welded, to both the outer rocker panel 16 and the inner rocker panel 64.

The reinforcement 18 may have a step 52 matching the step shape 50 of the steps 48. The shape 52 of the reinforcement 18 matches the step shape 50 of the steps 48 such that a positive connection is made between the step 52 of the reinforcement 18 and the step shape 50 of the steps 48. The step 52 of the reinforcement 18, i.e., the lower member 22, is fixed to the steps 48 of the first and second flanges 32, 34. The step 52 of the reinforcement 18 is fixed to the back wall 78, e.g., is welded to the back wall 78.

With reference to FIG. 3, the pillar 24 and the reinforcement 18 define a gap 54, hereinafter referred to as a retractor gap 54. The retractor gap 54 is between the pillar 24 and the reinforcement 18. For example, the retractor gap 54 is between the upper member 20 and the lower member 22, and extends from the upper member 20 and the lower member 22 to the pillar 24.

The lower member 22 defines a cavity 56 in communication with the retractor gap 54, as set forth further below. The cavity 56 may be defined by a raised surface (not numbered) in the lower member 22.

With reference to FIG. 2, the vehicle 10 includes a seat belt assembly having a seat belt retractor 60 and a seat belt webbing 84 retractably extendable from the seat belt retractor 60. The seat belt retractor 60 is fixed to the lower member 22 of the reinforcement 18, and the seat belt webbing 84 may be connected to the pillar 24, e.g., with the use of a D-ring.

The seat belt retractor 60 is disposed in the cavity 56 and extends through the retractor gap 54. The cavity 56 may be spaced from the channel 44, i.e., above the channel 44, and this configuration spaces the seat belt retractor 60 from the channel 44, i.e., the seat belt retractor 60 is disposed in the cavity 56 above the channel 44. This configuration leaves the channel 44 open, which may be used to house additional reinforcing members 62, as described further below.

The seat belt retractor 60 is fixed to the reinforcement 18. Specifically, the seat belt retractor 60 is fixed to the lower member 22 of the reinforcement 18. The lower member 22 may define a hole 86 through which the seat belt retractor 60 is fixed to the lower member 22. For example, a fastener 88 (as numbered in FIG. 2) may extend through the hole 86 and engage the seat belt retractor 60 to fix the seat belt retractor 60 to the lower member 22. The fastener 88 may be, for example, a threaded fastener, such as a bolt, or could be any other suitable type of fastener.

As described above, the reinforcement 18, specifically, the lower member 22 of the reinforcement 18 both reinforces the outer rocker panel 16 along the flange gap 46 and provides support for the seat belt retractor 60. This configuration reduces the number of components of the vehicle body 12 and reduces packaging constraints.

With reference to FIG. 5, the vehicle body 12 may include a plurality of reinforcing members 62 in the channel 44. For example, the reinforcing members 62 may be between the outer rocker panel 16 and the inner rocker panel 64, and the reinforcing members 62 may extend from the outer rocker panel 16 to the inner rocker panel 64. The reinforcing members 62 may add to the structural rigidity of the rocker 66.

As set forth above, packaging constraints are reduced as a result of the lower member 22 of the reinforcement 18 both reinforcing the outer rocker panel 16 and supporting the seat belt retractor 60. The lower member 22 also supports the seat belt retractor 60 outside of, i.e., above, the channel 44. Thus, space exists in the channel 44 to house the reinforcing members 62.

The reinforcing members 62 may have a shape that generally matches the cross-section shape of the channel 44, i.e., the reinforcing members 62 may be C-shaped, rectangular, etc. The reinforcing members 62 may be in the channel 44 at regular or irregular intervals along the axis 30. The reinforcing members 62 may be formed of any suitable material, for example, steel, aluminum, plastic, fiber-reinforced composite, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle body comprising:
   a rocker panel elongated along an axis;
   a pillar fixed to the rocker panel and elongated in a direction transverse to the axis;
   the rocker panel including a first flange and a second flange, the first flange and the second flange being on opposite sides of the pillar and spaced from each other with a gap between the first flange and the second flange in a direction parallel to the axis;

a reinforcement having a lower member extending across the gap from the first flange to the second flange, the lower member fixed to the first and second flanges, the reinforcement including an upper member spaced from the lower member transverse to the axis, the upper member being fixed to the pillar; and a seat belt retractor between the upper member and the lower member.

2. The vehicle body of claim 1, wherein the pillar and the rocker panel are integral.

3. The vehicle body of claim 1, wherein the upper member is elongated in a direction transverse to the axis.

4. The vehicle body of claim 1, wherein the lower member extends along the pillar from the rocker panel toward the upper member.

5. The vehicle body of claim 1, wherein the rocker panel includes a lower flange elongated along the axis, the lower flange being spaced from the first and second flanges in a direction transverse to the axis.

6. The vehicle body of claim 1, further comprising a second pillar fixed to the rocker panel and elongated in a direction transverse to the axis, and a roof rail extending from the pillar to the second pillar.

7. The vehicle body of claim 6, wherein the pillar, the second pillar, the rocker panel, and the roof rail are all integral.

8. The vehicle body of claim 6, wherein the pillar, the second pillar, the rocker panel, and the roof rail define an opening.

9. The vehicle body of claim 1, wherein the first flange and the second flange are elongated on a common axis, the common axis being parallel to the axis.

10. The vehicle body of claim 1, wherein the rocker panel includes an interior surface and an exterior surface opposite the interior surface, and the first and second flanges are disposed on the interior surface.

11. The vehicle body of claim 1, wherein the first and second flanges each have a step elongated along the axis, each step having a step shape, and the reinforcement having a step shape matching the step shape of the steps.

12. The vehicle body of claim 1, wherein the pillar and the lower member define a gap, the gap being between the pillar and the lower member.

13. The vehicle body of claim 12, a wherein the seat belt retractor is in the gap and fixed to the lower member.

14. The vehicle body of claim 13, wherein the lower member includes a cavity receiving the seat belt retractor.

15. The vehicle body of claim 1, wherein the rocker panel includes a lower flange elongated along the axis and spaced from the first and second flanges, and a channel defined by the lower flange and the first and second flanges.

16. The vehicle body of claim 15, further comprising a plurality of reinforcing members in the channel.

17. The vehicle body of claim 16, further comprising an inner rocker panel elongated along the axis and fixed to the rocker panel, the channel being between the rocker panel and the inner rocker panel.

18. The vehicle body of claim 1, wherein the upper member includes a channel elongated in a direction transverse to the axis, and further comprising a seat belt webbing extending from the seat belt retractor along the channel.

19. The vehicle body of claim 1, further comprising an inner rocker panel elongated along the axis and fixed to the rocker panel, the lower member of the reinforcement being between the rocker panel and the inner rocker panel.

* * * * *

UNITED STATES PATENT AND TRADEMARK OFFICE
CERTIFICATE OF CORRECTION

| | |
|---|---|
| PATENT NO. | : 10,399,602 B2 |
| APPLICATION NO. | : 15/435666 |
| DATED | : September 3, 2019 |
| INVENTOR(S) | : GaRam Jun et al. |

It is certified that error appears in the above-identified patent and that said Letters Patent is hereby corrected as shown below:

In the Claims

Column 8, Line 11, Claim 13:   delete "a" before "wherein".

Signed and Sealed this
Twenty-eighth Day of April, 2020

Andrei Iancu
*Director of the United States Patent and Trademark Office*